United States Patent
Wigren et al.

(10) Patent No.: US 9,480,068 B2
(45) Date of Patent: Oct. 25, 2016

(54) SCHEDULING IN CELLULAR COMMUNICATION SYSTEMS

(71) Applicant: Telefonaktiebolaget LM Ericsson (publ), Stockholm (SE)

(72) Inventors: Torbjorn Wigren, Uppsala (SE); Babak Alamshahi, Jarfalla (SE); Par Ankel, Nodinge (SE); Billy Hogan, Sollentuna (SE); Patrik Karlsson, Stockholm (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 240 days.

(21) Appl. No.: 14/347,367

(22) PCT Filed: Jan. 31, 2014

(86) PCT No.: PCT/SE2014/050126
§ 371 (c)(1),
(2) Date: Mar. 26, 2014

(87) PCT Pub. No.: WO2015/115950
PCT Pub. Date: Aug. 6, 2015

(65) Prior Publication Data
US 2015/0305044 A1    Oct. 22, 2015

(51) Int. Cl.
*H04W 72/04* (2009.01)
*H04W 72/12* (2009.01)
*H04B 17/345* (2015.01)
(Continued)

(52) U.S. Cl.
CPC ....... *H04W 72/0486* (2013.01); *H04B 17/345* (2015.01); *H04B 17/382* (2015.01); *H04W 16/24* (2013.01); *H04W 28/02* (2013.01); *H04W 72/1252* (2013.01); *H04W 84/02* (2013.01); *H04W 88/02* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 2008/0198802 A1* | 8/2008 | Zhang | H04W 28/08 370/329 |
| 2009/0088080 A1* | 4/2009 | Zhang | H04W 72/0486 455/63.1 |

(Continued)

FOREIGN PATENT DOCUMENTS

WO    2013172747 A1    11/2013

OTHER PUBLICATIONS

Wigren, et al., "Estimation of uplink WCDMA load in a single RBS", *Proc. IEEE VTC-2007*, (Oct. 1-3, 2007), 5 pages.
(Continued)

*Primary Examiner* — Dang Ton
*Assistant Examiner* — Ronald H Davis
(74) *Attorney, Agent, or Firm* — Nicholson De Vos Webster & Elliott LLP

(57) ABSTRACT

A method for scheduling enhanced uplink traffic in a cell in a cellular communication system comprises estimating of a rise-over-thermal measure for the cell. A momentary total load in the cell is computed based on the estimated rise-over-thermal measure. A load headroom is determined from at least a maximum allowed load and the momentary load. Future enhanced uplink traffic is scheduled in dependence of the determined load headroom. A degree of underutilization of enhanced uplink traffic grants in the cell is established. The scheduling comprises overbooking of enhanced uplink traffic in dependence on the established underutilization degree. A network node comprises corresponding functionalities.

21 Claims, 9 Drawing Sheets

(51) Int. Cl.
*H04B 17/382* (2015.01)
*H04W 16/24* (2009.01)
*H04W 28/02* (2009.01)
*H04W 84/02* (2009.01)
*H04W 88/02* (2009.01)
*H04W 88/08* (2009.01)

(56) References Cited

U.S. PATENT DOCUMENTS

| | | | |
|---|---|---|---|
| 2009/0097412 A1* | 4/2009 | Jain | H04W 52/12 |
| | | | 370/252 |
| 2012/0115522 A1 | 5/2012 | Nama et al. | |
| 2013/0100915 A1* | 4/2013 | Phan Huy | H04W 28/20 |
| | | | 370/329 |
| 2013/0157671 A1* | 6/2013 | Zhou | H04W 52/0206 |
| | | | 455/450 |
| 2013/0229990 A1* | 9/2013 | Fan | H04W 72/0486 |
| | | | 370/329 |
| 2013/0324175 A1 | 12/2013 | Wigren | |
| 2014/0133421 A1* | 5/2014 | Goodwin | H04W 72/1252 |
| | | | 370/329 |
| 2014/0334455 A1* | 11/2014 | Wigren | H04W 72/1252 |
| | | | 370/335 |

OTHER PUBLICATIONS

Wigren, T., "Recursive Noise Floor Estimation in WCDMA", *IEEE Transactions on Vehicular Technology, vol. 59. No. 5*, (Jun. 2010), pp. 2615-2620.

Wigren, T., "WCDMA Uplink Load Estimation With Generalized Rake Receivers", *IEEE Transactions on Vehicular Technology, Vol. 61, No. 5*, (Jun. 2012), pp. 2394-2400.

International Search Report and Written Opinion, Application No. PCT/SE2014/050126, dated Oct. 13, 2014, 10 pages.

* cited by examiner

SCHEDULING IN CELLULAR COMMUNICATION SYSTEMS

CROSS-REFERENCE TO RELATED APPLICATIONS

This application is a National stage of International Application No. PCT/SE2014/050126, filed Jan. 31, 2014, which is hereby incorporated by reference.

TECHNICAL FIELD

The present disclosed technique refers in general to scheduling in cellular communication systems and in particular to methods and nodes for scheduling of enhanced uplink traffic.

BACKGROUND

In Wideband Code Division Multiple Access (WCDMA), Enhanced UpLink (EUL) has been available for some time for supporting transfer of larger quantities of information from a User Equipment (UE) to the Radio Base Station (RBS). The WCDMA EUL aims at scheduling traffic to times when the uplink interference situation is favorable, thereby utilizing air interface resources in as good a way as possible. The air interface load is measured by the noise rise, over the thermal level, a quantity denoted Rise over Thermal (RoT).

A "grant" is a permission for a UE to use certain uplink resources. The grants are thus the quantities signaled to the UE indicating what rate (actually power) it may use for its transmission. The UE is allowed to, but need not, use its complete grant. Relative grants are used to control the interference in neighbor cells. These can only decrease the current grant of the UE one step. It is stressed that there are only a discrete number of grant levels that can be used.

The task of the scheduler in a wireless communication system is to schedule EUL user traffic, to enhance user and cell capacity. At the same time the scheduler keeps track of the air interface cell load, avoiding over-scheduling that may cause cell instability and loss of coverage. The scheduler also keeps track of other available traffic, accounting for transport resources and hardware. The scheduler receives, measures and estimates quantities relevant for its scheduling operation, and transmits order to UEs, primarily in the form of granted power/bitrates.

The EUL utilizes a scheduler that aims at filling the load headroom of the air interface, so that the different user requests for bitrates are met. The air-interface load in WCDMA is typically determined in terms of the RoT, a quantity that is measured in the RBS. When evaluating scheduling decisions, the scheduler has to predict the load that results from the scheduled grants, to make sure that the scheduled load does not exceed the load thresholds for coverage and stability. This is complicated since the grant given to a UE does only express a limit on the UpLink (UL) power it is allowed to use, so the UE may use only a portion of its grant. The present scheduler makes typically a worst case analysis, assuming that all UEs use their grants at all times. Unfortunately, users do, at least from time to time, seem to have a relatively low utilization of grants.

There are also additional reasons why it is difficult to predict the load. This has to do with the fact that the link level channel conditions and the receiver performance has a strong impact on how large the load in terms of RoT becomes, for a given grant.

WCDMA has an inner loop power control aiming in adjusting the power levels. The inner loop power controller operates at a frequency of 1500 Hz. A Fast Congestion Control (FCC) functionality is often also available, where actions are taken in response to a declared power rush, normally by breaking at least a subset of the power control loops. This may be performed e.g. by sending a "down" command as long as an interference rush persists.

As a conclusion, the enhanced uplink of EUL operates by granting UEs the right to perform transmissions at a maximum rate. The grants are determined by the scheduler of the RBS that tries to fill the available load headroom, thereby optimizing the performance of EUL. The scheduler does this by prediction of the load caused by different scheduling decisions. The problem is unfortunately that the UEs does not have to use their grants. In particular smart phones tend to transmit small chunks of data and only need large grants occasionally. The result of this, also observed in the field, is a severe underutilization of EUL representing an unacceptable waste of resources.

SUMMARY

A general object of the presented technology is to provide means for a more efficient utilization of the available load headroom for EUL. The above object is achieved by methods and devices according to the independent claims. Preferred embodiments are defined in dependent claims. In general words, in a first aspect, a method for scheduling enhanced uplink traffic in a cell in a cellular communication system comprises estimating of a rise-over-thermal measure for the cell. A momentary total load in the cell is computed based on the estimated rise-over-thermal measure. A load headroom is determined from at least a maximum allowed load and the momentary load. Future enhanced uplink traffic is scheduled in dependence of the determined load headroom. A degree of underutilization of enhanced uplink traffic grants in the cell is established. The scheduling comprises overbooking of enhanced uplink traffic in dependence on the established underutilization degree.

In a second aspect, a network node in a cell of a cellular communication system comprises a load meter and a scheduling assistant, being in information contact with the load meter. The load meter is operative for estimating a rise-over-thermal measure for the cell. The load meter is further operative for computing a momentary total load in the cell based on the estimated rise-over-thermal measure. The load meter is further operative for determining a load headroom from at least a maximum allowed load and the momentary load. The scheduling assistant is operative for scheduling future enhanced uplink traffic in dependence of the determined load headroom. The scheduling assistant is further operative for establishing a degree of underutilization of enhanced uplink traffic grants in the cell. The scheduling assistant is further operative for overbooking of enhanced uplink traffic in dependence on the established underutilization degree.

In a third aspect, a network node in a cell of a cellular communication system comprises a wireless interface, a network interface, a processor and a storage comprising instructions executable by the processor. The network node is operative to estimate a rise-over-thermal measure for the cell, to compute a momentary total load in the cell based on the estimated rise-over-thermal measure and to determine a load headroom from at least a maximum allowed load and the momentary load. The network node is further operative to schedule future enhanced uplink traffic in dependence of the determined load headroom and to establish a degree of underutilization of enhanced uplink traffic grants in the cell. The scheduling thereby comprises overbooking of enhanced uplink traffic in dependence on the established underutilization degree.

In a fourth aspect, a network node in a cell of a cellular communication system comprising an estimating module for estimating a rise-over-thermal measure for said cell, a computing module for computing a momentary total load in the cell based on the estimated rise-over-thermal measure and a determining module for determining a load headroom from at least a maximum allowed load and the momentary load. The network node further comprises a scheduling module for scheduling future enhanced uplink traffic in dependence of the determined load headroom and an establishing module for establishing a degree of underutilization of enhanced uplink traffic grants in said cell. The scheduling module is thereby further capable of overbooking of enhanced uplink traffic in dependence on the established underutilization degree.

In a fifth aspect, a computer program, residing in a storage, comprises program code, which when executed by a processing circuitry causes the processing circuitry to estimate a rise-over-thermal measure for the cell, to compute a momentary total load in the cell based on the estimated rise-over-thermal measure and to determine a load headroom from at least a maximum allowed load and the momentary load. The program code further causes the processing circuitry to schedule future enhanced uplink traffic in dependence of the determined load headroom and to establish a degree of underutilization of enhanced uplink traffic grants in the cell. The scheduling thereby comprises overbooking of enhanced uplink traffic in dependence on the established underutilization degree.

In a sixth aspect, a computer program product comprises a computer-readable medium on which a computer program is stored, which computer program comprises program code, which when executed by a processing circuitry causes the processing circuitry to estimate a rise-over-thermal measure for the cell, to compute a momentary total load in the cell based on the estimated rise-over-thermal measure and to determine a load headroom from at least a maximum allowed load and the momentary load. The program code further causes the processing circuitry to schedule future enhanced uplink traffic in dependence of the determined load headroom and to establish a degree of underutilization of enhanced uplink traffic grants in the cell. The scheduling thereby comprises overbooking of enhanced uplink traffic in dependence on the established underutilization degree.

One advantage with the proposed technology is that it provides refined load control, based on the accurately measured and high bandwidth RoT, enabling load overbooking, and thereby boasting UL throughput significantly. Other advantages will be appreciated when reading the detailed description.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

For a better understanding of the proposed technology, it may be useful to begin with a brief overview of some aspects of a wireless communication system.

Figure 1:
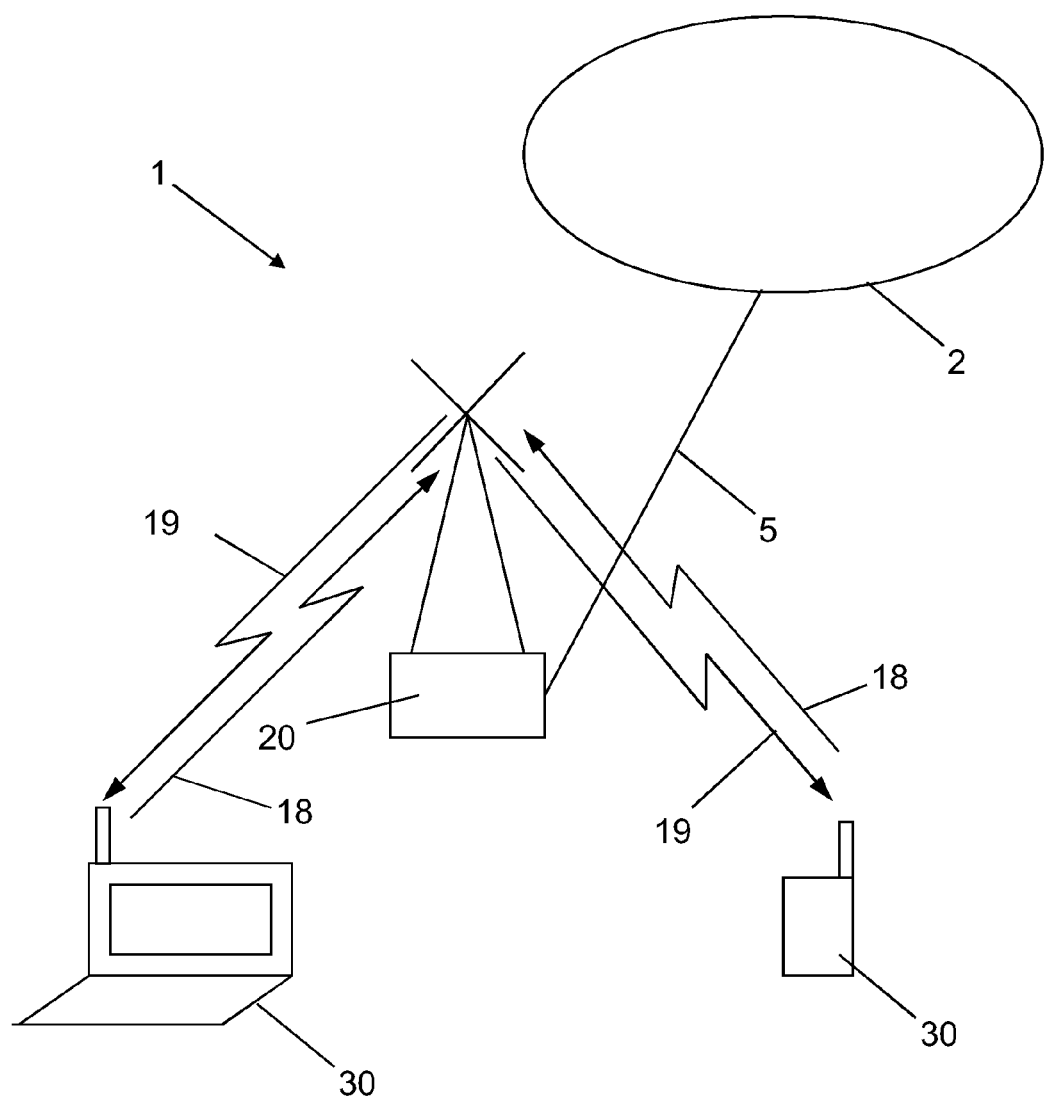
FIG. 1 is a schematic illustration of a cellular communication system.

FIG. 1 illustrates schematically a telecommunication system. A RBS 20, e.g. a Node B, is connected by a connection 5 to a core network 2 of a telecommunication system 1. The RBS 20 is operative to communicate with different UEs 30. Downlink (DL) signals are sent from the RBS 20 on DL links 19 to the UEs 30. Similarly UL signals are sent from the UEs 30 on UL links 18 to the RBS 20. The network node therefore includes radio circuitry for communication with one or more other nodes, including transmitting and/or receiving information.

As used herein, the term "wireless device" may refer to a User Equipment (UE) a mobile phone, a cellular phone, a Personal Digital Assistant (PDA) equipped with radio communication capabilities, a smart phone, a laptop or Personal Computer (PC) equipped with an internal or external mobile broadband modem, a tablet PC with radio communication capabilities, a portable electronic radio communication device, a sensor device equipped with radio communication capabilities or the like. In particular, the term "UE" should be interpreted as a non-limiting term comprising any device equipped with radio circuitry for wireless communication according to any relevant communication standard.

As used herein, the term "radio network node" or simply "network node" may refer to base stations, network control nodes, and the like. In particular, the term "base station" may encompass different types of radio base stations including standardized base stations such as Node Bs, or evolved Node Bs, eNBs, and also macro/micro/pico radio base stations, home base stations, also known as femto base stations, relay nodes, repeaters, radio access points, and even radio control nodes controlling one or more Remote Radio Units (RRUs), or the like.

Wireless communication systems of today have different way to handle load and scheduling. Some aspects of these are presented in Appendix A.

Underutilization of the uplink resources depends to a large extent on non-utilized grants of EUL. However, since also other effects may influence the underutilization and by the fact that the degree of non-utilized grants may vary with time and circumstances, additional information is needed in order to in a safe manner improve the utilization degree.

Figure 6:
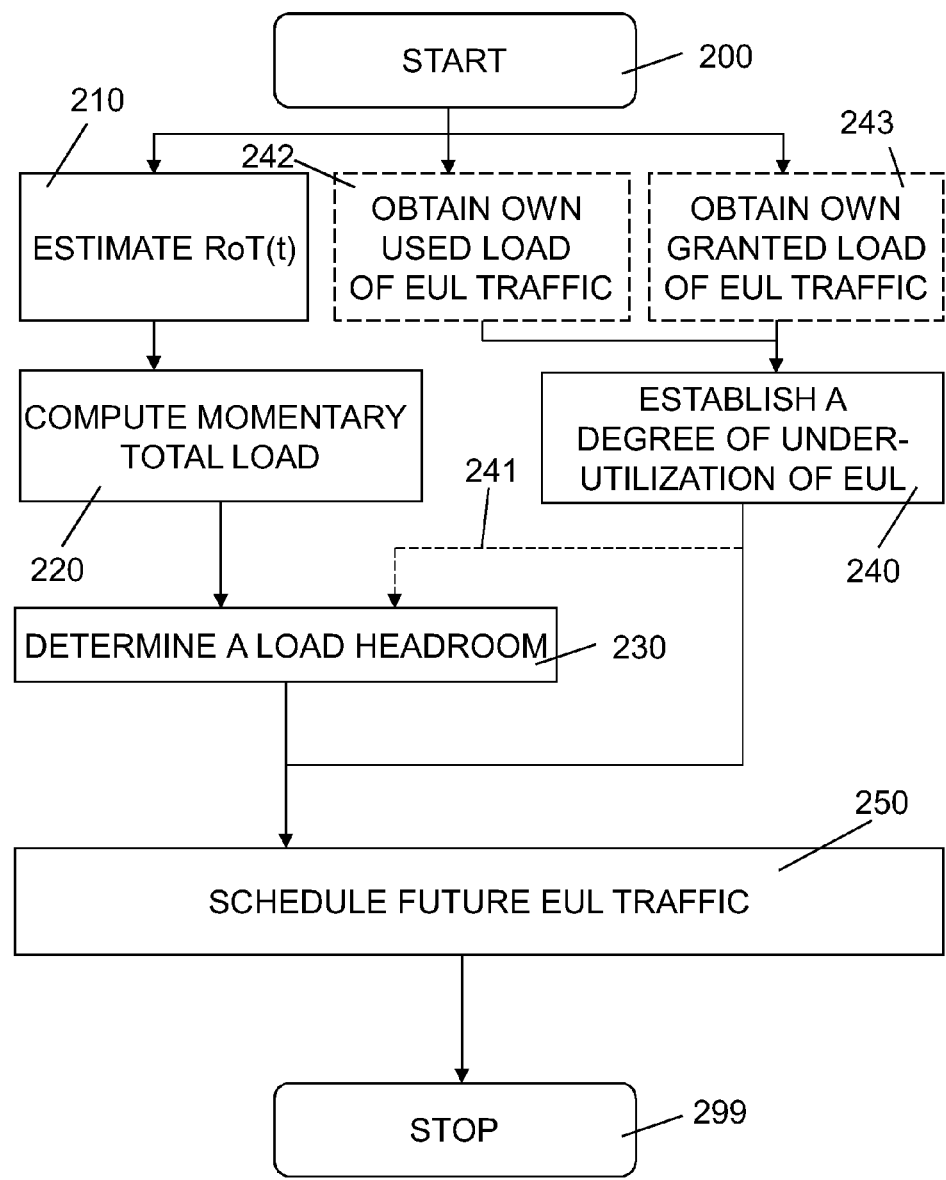
FIG. 6 is a flow diagram of steps of an embodiment of a method for scheduling enhanced uplink traffic.

FIG. 6 illustrates a flow diagram of steps of an embodiment of a method for scheduling enhanced uplink traffic.

The method for scheduling enhanced uplink traffic in a cell in a cellular communication system starts in step 200. In step 210, a rise-over-thermal measure is estimated for the cell. A momentary total load in the cell, is computed in step 220, based on the estimated rise-over-thermal measure. In step 240, a degree of underutilization of enhanced uplink traffic grants in the cell is established.

In a preferred embodiment, a quantity of an own used load of enhanced uplink traffic is obtained in step 242, and a quantity of an own granted load of enhanced uplink traffic is obtained in step 243. The step 240 of establishing a degree of underutilization of enhanced uplink traffic grants in the cell then preferably comprises estimating of a utilization factor expressing a relation between the quantity of an own used load of enhanced uplink traffic and the quantity of an own granted load of enhanced uplink traffic. The degree of underutilization is thereby possible to be determined by quantities that are relatively easily obtained within the network node or nodes connected thereto.

In the present disclosure, the expression "a factor expressing a relation between a first and a second quantity" is used for describing that the factor is dependent on the magnitude of both the first and second quantity. Furthermore, the factor is also dependent on the quantities in different, typically opposite, ways. The relation between the first and second quantity is typically expressed as a difference between the quantities, a function of a difference between the quantities, a difference between functions of the quantities, a quotient between the quantities, a quotient between functions of the quantities or a function of a quotient between the quantities. In a general sense, an increase in size of one of the quantities gives a change of the parameter in an opposite direction compared to an increase in size of the other quantity. A relation between a first and second quantity thereby involves a kind of comparison between the two involved quanitites.

In one embodiment, the step of obtaining a quantity of an own used load of enhanced uplink traffic comprises the step of measuring an own used load of enhanced uplink traffic by decoding a Transport Format Combination Indicator (TFCI) message. The TFCI messages are in general available and can indeed be utilized for extracting the requested information.

In one embodiment, the step of obtaining a quantity of an own granted load of enhanced uplink traffic comprises fetching grant orders from a scheduler. In order to have a fully reliable process, it is beneficial to fetch this type of information directly from the source.

In one embodiment, the estimation of a utilization factor comprises filtering a number of ratios between the measure of an own used load of enhanced uplink traffic and the measure of an own granted load of enhanced uplink traffic. Since the momentary utilization of the grants may vary relatively rapidly, and the scheduling takes place with a certain degree of delay, filtering might be beneficial for mitigating fluctuation resonance phenomena. The momentary utilization is thereby used, but in an averaged manner. Furthermore, older momentary utilization measures are given lower importance with time. In a preferred embodiment, the filtering is a linear filtering. The linear filtering is in general easily applicable and provides easily tunable filter properties that may be adapted to the actual system in which it is used.

In one embodiment, the load utilization estimation can be performed as follows. A measurement of the momentary load utilization can be made available per cell. In a first step the decoded TFCIs for ordinary traffic and for enhanced dedicated channel traffic show which grants the UE actually used in the last TTI. This provides the information needed to compute the actual load factor of the last TTI, i.e. to compute $L_{own,measured}(t)$. The corresponding prediction, $L_{own,predicted}(t)$, is stored by the scheduler and can be fetched when needed. Given these two quantities an estimated load utilization $\alpha(t)$ can be obtained by averaging as:

$$\alpha(t) = \gamma_1 \alpha(t-1) + (1 - \gamma_1) \frac{L_{own,measured}}{L_{own,predicted}}. \qquad (12)$$

Here $\gamma_1$ sets the time constant of the averaging estimator.

In an alternative view, the degree of underutilization of enhanced uplink may also be expressed in less deterministic terms. For instance, the degree of underutilization could be a classification into a number of classes. In a particular embodiment, the degree of underutilization could be given one of the classes "almost none", "minor underutilization" and "severe underutilization". These classes may then give rise to different scheduling schemes employing different degrees of aggressive overbooking. The "almost none" could e.g. correspond to a "prior art" scheduling, the "minor underutilization" could give rise to a moderate overbooking and "severe underutilization" could result in an aggressive scheduling scheme.

In step 230, a load headroom is determined from at least a maximum allowed load and the momentary load.

In a preferred embodiment, the determining of a load headroom comprises determining of a momentary load headroom that is calculated as a difference between a maximum allowed rise-over-thermal and the momentary total load in the cell. This is a definition of the load headroom that will be useful for most applications, even if there are alternative ways.

In alternative embodiments, as indicated by a dotted line 241, the determination of the load headroom can additionally be based on the degree of underutilization. In this case, already the load headroom is modified for compensating for the underutilization. This can be useful e.g. in cases where changes in the actual procedures of scheduling cannot be easily modified.

In the embodiment of FIG. 6, in step 250, future enhanced uplink traffic is scheduled in dependence of the determined load headroom. The scheduling of step 250 comprises overbooking of enhanced uplink traffic in dependence on the established underutilization degree. The process ends in step 299.

In the present disclosure, the term "in dependence on" is interpreted such that there are at least two different determined load headrooms that will give rise to different scheduling even if all other parameters are the same. In other words, a change in determined load headroom only, may give a difference in scheduling. However, since scheduling in general is dependent on many variables, two different determined load headrooms may still give rise to the same final scheduling.

In one embodiment, the method comprises the further step of obtaining a value of a maximum allowed load of enhanced uplink traffic, and the further step of estimating a scheduling utilization factor by the measure of an own granted load of enhanced uplink traffic and the value of a maximum allowed load of enhanced uplink traffic. The step of establishing a degree of underutilization of enhanced uplink traffic grants in the cell then preferably comprises compensating the degree of underutilization by the scheduling utilization factor. As will be discussed more in connection with other embodiments further below, a more precise estimation of the actual underutilization can be obtained if other factors influencing the total load can be excluded. One such factor is the scheduling utilization factor, which expresses the efficiency of filling up the available resources allowed for scheduling. A scheduler that cannot fully schedule all available resources should preferably not influence the measure of underutilization.

In one embodiment, the scheduling utilization estimation can be performed as follows. The scheduler may not be allowed to schedule the complete predicted load. The average effect of such limitations could as mentioned above be modeled as the average scheduling utilization β(t):

$$\beta(t) = \gamma_2 \beta(t-1) + (1-\gamma_2) \frac{L_{own,predicted}}{L_{max\ scheduled}}. \quad (13)$$

Here $\gamma_2$ sets the time constant of the averaging estimator. It is a matter of choice if (13) is to be included in the solution. Note that (13) is dictated by product considerations, the most important aspect is the use of (12).

In one embodiment; the determination of a load headroom comprises determining of a nominal load headroom. The nominal headroom is calculated as a difference between a maximum allowed rise-over-thermal and an estimated load from sources outside the cell. The estimated load from sources outside the cell is a filtered difference between the momentary total load in the cell and the own used load of enhanced uplink traffic.

In one embodiment, the headroom determination is computed according to the following. In prior art headroom determination starts by a first summation of the load factors of the own cell and the other load as $L_{used}(t) = L_{own,measured} + L_{other}$. The other load is obtained by filtering of the measured RoT, thereby reducing the available bandwidth of the computed own load. The headroom is then determined as the difference $L_{Headroom}(t) = L_{RoT,max} - L_{used}(t)$. However, in the present embodiment a momentary total load in the cell, is computed as:

$$L_{used,RoT}(t) = 1 - \frac{1}{RoT(t)}, \quad (14)$$

and the headroom as:

$$L_{Headroom}(t) = L_{RoT,max} - L_{used,RoT}(t). \quad (15)$$

Figure 7:
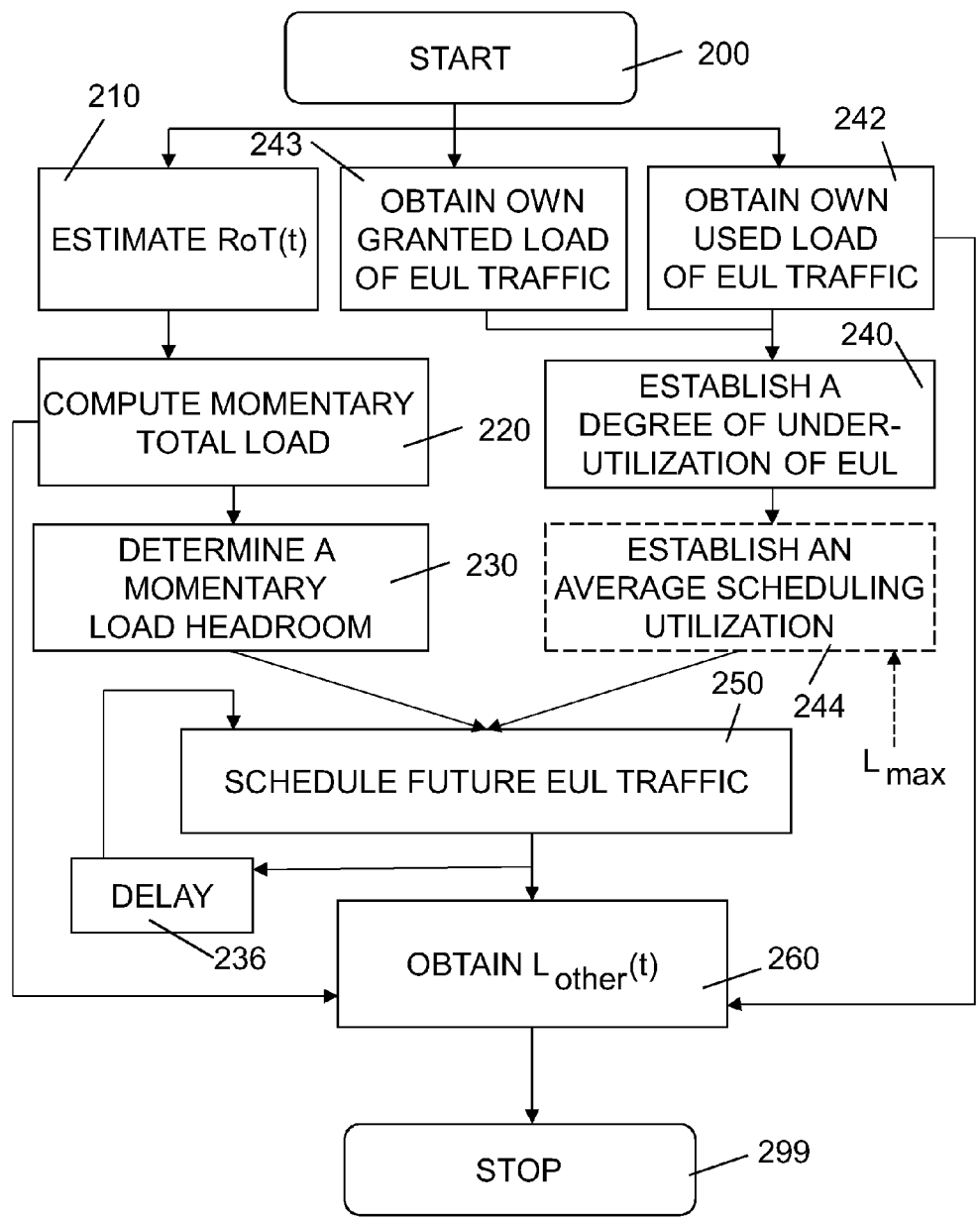
FIG. 7 is a flow diagram of steps of another embodiment of a method for scheduling enhanced uplink traffic.

The advantage is that since RoT(t) is measured very accurately even with 2 ms TTI (cf. prior art above), $L_{used}(t)$ becomes more accurate and faster than prior art methods. The embodiment is illustrated in FIG. 7. The method receives measurements of the received total wideband power RTWP(t). This measurement is used for estimation of the thermal noise power floor and subsequently the RoT(t) is estimated, in step 210, according to well-known principles. In step 220, the momentary total load is computed, in this embodiment according to (14). In step 230, the momentary headroom is then computed, in this embodiment according to (15). This procedure gives the headroom available right now.

In step 242, a quantity of an own used load of enhanced uplink traffic is obtained, in this embodiment by measuring $L_{own,measured}(t)$ by TFCI decoding. In step 243, a quantity of an own granted load of enhanced uplink traffic is obtained, in this embodiment by fetching $L_{own,predicted}(t)$ from the scheduler. The step 240 of establishing a degree of underutilization of enhanced uplink traffic grants in the cell comprises in this embodiment estimation of a utilization factor according to (12).

Given an estimated load utilization according to (12) and a high bandwidth measured headroom according to (14) and (15), it becomes clear that in order to fill the available load headroom, it is not enough to schedule load according only to the headroom. The reason is of course the fact that there is a risk for underutilization. Therefore, the statistical scheduling decision according to the present embodiment is to compute, in step 250, the following amount of load to fill the headroom:

$$L_{Scheduled}(t) = L_{Scheduled,remaining}(t-1) + \quad (16)$$
$$\frac{1}{\alpha(t)}(L_{Headroom}(t) + (L_{Scheduled}(t) - L_{Scheduled,remaining}(t-1))).$$

Here $L_{Scheduled,remaining}(t-1)$ is the load that originates from exactly the same granting in the previous time instant. The parts that have been removed need to be statistically overbooked as indicated by (16). Equation (16) will be exact in case the utilization of the new granted load is utilized and scheduled to the same degree as shown by the estimate α(t). Note that (16) also needs to be solved for $L_{Scheduled}(t-1)$. If the utilization is higher than previously, over-scheduling occurs.

The risk for overscheduling can be mitigated by introduction of a safety factor δ<1, in step 250, giving:

$$L_{Scheduled}(t) = L_{Scheduled,remaining}(t-1) + \quad (17)$$
$$\delta \frac{1}{\alpha(t)}(L_{Headroom}(t) + (L_{Scheduled}(t) - L_{Scheduled,reamining}(t-1))).$$

Analogously, intentional overbooking can also be introduced. This can boost throughput further by running the UL at significantly higher levels of RoT. Due to fading and other reasons instability can result, causing power rushes. Such rushes are however avoided by so called fast congestion control, as briefly discussed in the Appendix A. One alternative to achieve overbooking would be to alter (16) with an overbooking factor o>1 instead, i.e. to use:

$$L_{Scheduled}(t) = L_{Scheduled,remaining}(t-1) + \quad (18)$$
$$o \frac{1}{\alpha(t)}(L_{Headroom}(t) + (L_{Scheduled}(t) - L_{Scheduled,remaining}(t)))$$

in step 250. It is evident from (18) that the overbooking factor expands the headroom proportionally.

In an alternative embodiment, illustrated in FIG. 7 with dotted lines, the average scheduling utilization β(t) is additionally utilized. In step 244, the average scheduling utilization β(t) is estimated according to (13), by utilizing $L_{max\ scheduled}$. The computation in step 250 of the load to be scheduled is then performed according to:

$$L_{Scheduled}(t) = L_{Scheduled,remaining}(t-1) + \qquad (19)$$
$$\frac{\beta(t)}{\alpha(t)}(L_{Headroom}(t) + (L_{Scheduled}(t) - L_{Scheduled,remaining}(t-1)))$$

for a nominal booking, according to:

$$L_{Scheduled}(t) = L_{Scheduled,remaining}(t-1) + \qquad (20)$$
$$\delta \frac{\beta(t)}{\alpha(t)}(L_{Headroom}(t) + (L_{Scheduled}(t) - L_{Scheduled,remaining}(t-1)))$$

for an underbooking, and according to:

$$L_{Scheduled}(t) = L_{Scheduled,remaining}(t-1) + \qquad (21)$$
$$o \frac{\beta(t)}{\alpha(t)}(L_{Headroom}(t) + (L_{Scheduled}(t) - L_{Scheduled,remaining}(t)))$$

for an overbooking. The introduction of the average scheduling utilization $\beta(t)$ can also be considered as a modification of the $\alpha(t)$.

The $L_{Scheduled,remaining}(t)$ resulting from the computation step 250 is used after a delay 236 as input to the next TTI computation in step 250.

As a side effect, the measurement of $L_{used,RoT}(t)$ allows for obtaining of the other load as:

$$L_{other}(t) = L_{used}(t) - L_{own,measured}(t). \qquad (22)$$

This is illustrated as being optional in FIG. 7 by step 260.

As a summary, the method according to the main embodiment of FIG. 7 starts by measurement and fetching of load factors needed for estimation of the utilized load and the scheduling utilization. That is done, based on the load factors, according to (12) and (13). Following this, the corresponding load $L_{used,RoT}(t)$ is computed, this quantity being very accurate and being available with a high BW with maintained accuracy. Then, the available headroom can be obtained, also with a high BW and very good accuracy. The method proceeds by checking if overbooking or under booking is to be used.

The present technical ideas are typically implemented in the RBS of the WCDMA Radio Access Network (RAN). The RTWP measurement and the RoT estimator can be implemented either in the radio subsystem or in base band. All remaining functionality is typically implemented in base band. In one embodiment, the base band contains a scheduling unit that in turn has a load estimator and a load predictor associated with it. The load estimator receives data from a so called TFCI decoder that allows it to compute the measured $L_{own,measured}(t)$. The load predictor stores earlier predicted loads $L_{own,predicted}(t)$ that the scheduler was using to evaluate scheduling decisions that affected the current measured own cell load. To be able to conveniently implement the invention the base band is preferably equipped with a utilization estimator that keeps track of the average load utilization of EUL. That information is then used by the load predictor to predict the scheduled load $L_{Scheduled}(t)$, accounting for the estimated utilization, the remaining scheduled load of the previous scheduling time instant, and a preconfigured parameter determining if overbooking is to be applied. The grants corresponding to the scheduled load are then sent to the affected UEs. Finally the base band can obtain the other cell load. This is done by an $L_{other}$— obtaining unit of the base band.

Figure 8:
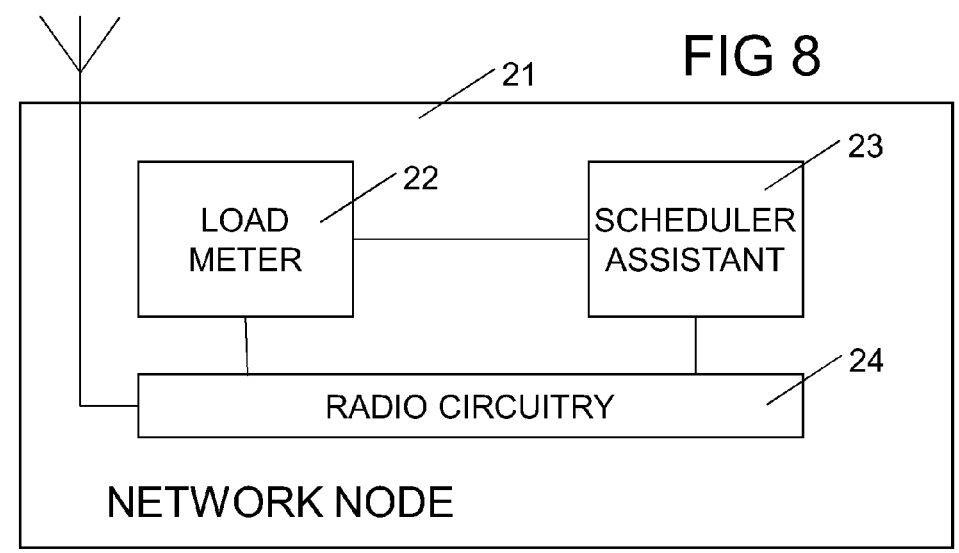
FIG. 8 is a block diagram of an embodiment of a network node.

An embodiment of a network node is illustrated in FIG. 8 by means of a block scheme. The network node 21 is a node in a cell of a cellular communication system, as mentioned above typically an RBS. The network node 21 comprises a load meter 22 and a scheduling assistant 23. The load meter is operative for estimating a rise-over-thermal measure for the cell. The load meter 22 is also operative for computing a momentary total load in the cell based on the estimated rise-over-thermal measure. The load meter 22 is further operative for determining a load headroom from at least a maximum allowed load and the momentary load. The scheduling assistant 23 is in information contact with the load meter. The load meter 22 and the scheduling assistant 23 may be implemented fully or partly by a common processor or circuitry or may be implemented separately but having capabilities of exchanging information. The scheduling assistant 23 is operative for scheduling future enhanced uplink traffic in dependence of the determined load headroom. The scheduling assistant 23 is also operative for establishing a degree of underutilization of enhanced uplink traffic grants in the cell. Thanks to the availability of such information, the scheduling assistant 23 is further operative for overbooking of enhanced uplink traffic in dependence on the established underutilization degree.

In one particular embodiment, the scheduling assistant is further operative for obtaining a quantity of an own used load of enhanced uplink traffic. In a further particular embodiment, the scheduling assistant is further operative for performing the obtaining of a quantity of an own used load of enhanced uplink traffic by measuring an own used load of enhanced uplink traffic by decoding a TFCI message. The scheduling assistant is further operative for obtaining a quantity of an own granted load of enhanced uplink traffic. In a further particular embodiment, the scheduling assistant is further operative for performing the obtaining of a quantity of an own granted load of enhanced uplink traffic by fetching grant orders from a scheduler. By access to the quantity of an own used load of enhanced uplink traffic and the quantity of an own granted load of enhanced uplink traffic, the scheduling assistant is therefore further operative for performing the establishing a degree of underutilization of enhanced uplink traffic grants in the cell by estimating a utilization factor expressing a relation between the quantity of an own used load of enhanced uplink traffic and the quantity of an own granted load of enhanced uplink traffic.

In a particular embodiment, the scheduling assistant is further operative for performing the estimating of a utilization factor by filtering a number of ratios between the measure of an own used load of enhanced uplink traffic and the measure of an own granted load of enhanced uplink traffic. Preferably, the scheduling assistant is further operative for performing the filtering as a linear filtering.

In one embodiment, the scheduling assistant is further operative for obtaining a value of a maximum allowed load of enhanced uplink traffic. The scheduling assistant is further operative for estimating a scheduling utilization factor by the measure of an own granted load of enhanced uplink traffic and the value of a maximum allowed load of enhanced uplink traffic. The scheduling assistant is thereby further operative for performing the establishing of a degree of underutilization of enhanced uplink traffic grants in the cell by compensating the degree of underutilization by the scheduling utilization factor.

In one embodiment, the load meter is further operative to perform the determining of a load headroom by determining a nominal load headroom. Such a nominal headroom is calculated as a difference between a maximum allowed rise-over-thermal and an estimated load from sources outside the cell. The estimated load from sources outside the cell is a filtered difference between the momentary total load in the cell and the own used load of enhanced uplink traffic.

In one embodiment, the load meter is further operative to perform the determining of a load headroom by determining a momentary load headroom, said momentary headroom being calculated as a difference between a maximum allowed rise-over-thermal and the momentary total load in the cell.

The network node 21 may also include radio circuitry 24 for communication with one or more other nodes, including transmitting and/or receiving information.

It will be appreciated that the methods and devices described above can be combined and re-arranged in a variety of ways.

For example, embodiments may be implemented in hardware, or in software for execution by suitable processing circuitry, or a combination thereof.

The steps, functions, procedures, modules and/or blocks described above may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described above may be implemented in software such as a computer program for execution by suitable processing circuitry including one or more processing units.

The flow diagram or diagrams presented above may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

In the following, an embodiment of a computer implementation will be described with reference to FIG. 9. The network node 21 in a cell of a cellular communication system comprises processing circuitry such as one or more processors 301 and a memory or storage 302. In this embodiment, at least some of the steps, functions, procedures, modules and/or blocks described above are implemented in a computer program, which is loaded into the memory for execution by the processing circuitry. In a particular embodiment, instructions in the storage 302 are executable by the processor 301, whereby the network node 21 becomes operative to estimate a rise-over-thermal measure for the cell, to compute a momentary total load in the cell based on the estimated rise-over-thermal measure, to determine a load headroom from at least a maximum allowed load and the momentary load, to schedule future enhanced uplink traffic in dependence of the determined load headroom, and to establish a degree of underutilization of enhanced uplink traffic grants in said cell, whereby the scheduling comprises overbooking of enhanced uplink traffic in dependence on the established underutilization degree. The processing circuitry and memory are interconnected to each other to enable normal software execution. An optional input/output device may also be interconnected to the processing circuitry and/or the memory to enable input and/or output of relevant data such as input parameter(s) and/or resulting output parameter(s).

Figure 9:
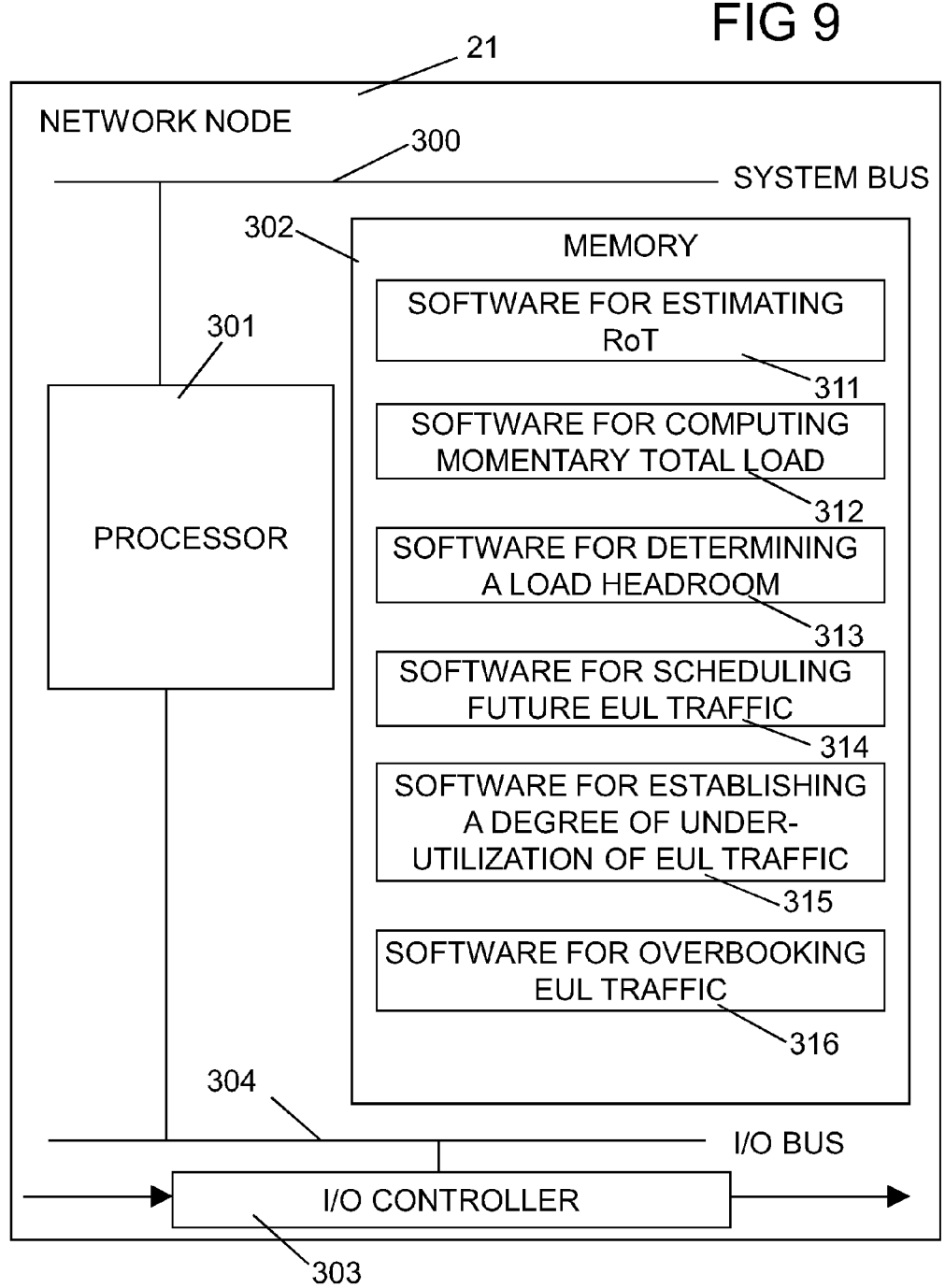
FIG. 9 is a block diagram of an embodiment of a network node based on a processor.

The embodiment of FIG. 9 is based on a processor 301, a memory 302, a system bus 300, an input/output (I/O) controller 303 and an I/O bus 304. In this embodiment input parameters, such as power measurements are received by the I/O controller 303 and are stored in the memory 302. The I/O controller 303 also controls the issue of e.g. schedules. The processor 301, which may be implemented as one or a set of cooperating processors, executes software components stored in the memory 302 for performing the activities associated with scheduling. The processor 301 communicates with the memory 302 over the system bus 300. In particular, software component 311 may implement the functionality of estimating a rise-over-thermal measure for the cell, of the load meter 22 (FIG. 8). Software component 312 may implement the functionality of computing a momentary total load in the cell based on the estimated rise-over-thermal measure, of the load meter 22 (FIG. 8). Software component 313 may implement the functionality of determining a load headroom from at least a maximum allowed load and the momentary load, of the load meter 22 (FIG. 8). Software component 314 may implement the functionality of scheduling future enhanced uplink traffic in dependence of the determined load headroom, of the scheduling assistant 23 (FIG. 8). Software component 315 may implement the functionality of establishing a degree of underutilization of enhanced uplink traffic grants in the cell, of the scheduling assistant 23 (FIG. 8). Software component 316 may implement the functionality of overbooking of enhanced uplink traffic in dependence on said established underutilization degree, of the scheduling assistant 23 (FIG. 8).

The term 'computer' should be interpreted in a general sense as any system or device capable of executing program code or computer program instructions to perform a particular processing, determining or computing task.

In a particular embodiment, the computer program comprises program code which when executed by the processing circuitry or computer causes the processing circuitry or computer to estimate a rise-over-thermal measure for the cell, to compute a momentary total load in the cell based on the estimated rise-over-thermal measure, to determine a load headroom from at least a maximum allowed load and the momentary load, to schedule future enhanced uplink traffic in dependence of the determined load headroom, and to establish a degree of underutilization of enhanced uplink traffic grants in the cell, whereby the scheduling comprises overbooking of enhanced uplink traffic in dependence on the established underutilization degree.

As indicated above, the wireless device may alternatively be defined as a group of function modules, where the function modules are implemented as a computer program running on a processor.

The computer program residing in memory may thus be organized as appropriate function modules configured to perform, when executed by the processor 301, at least part of the steps and/or tasks described above. An example of such function modules is illustrated in FIG. 10.

Figure 10:
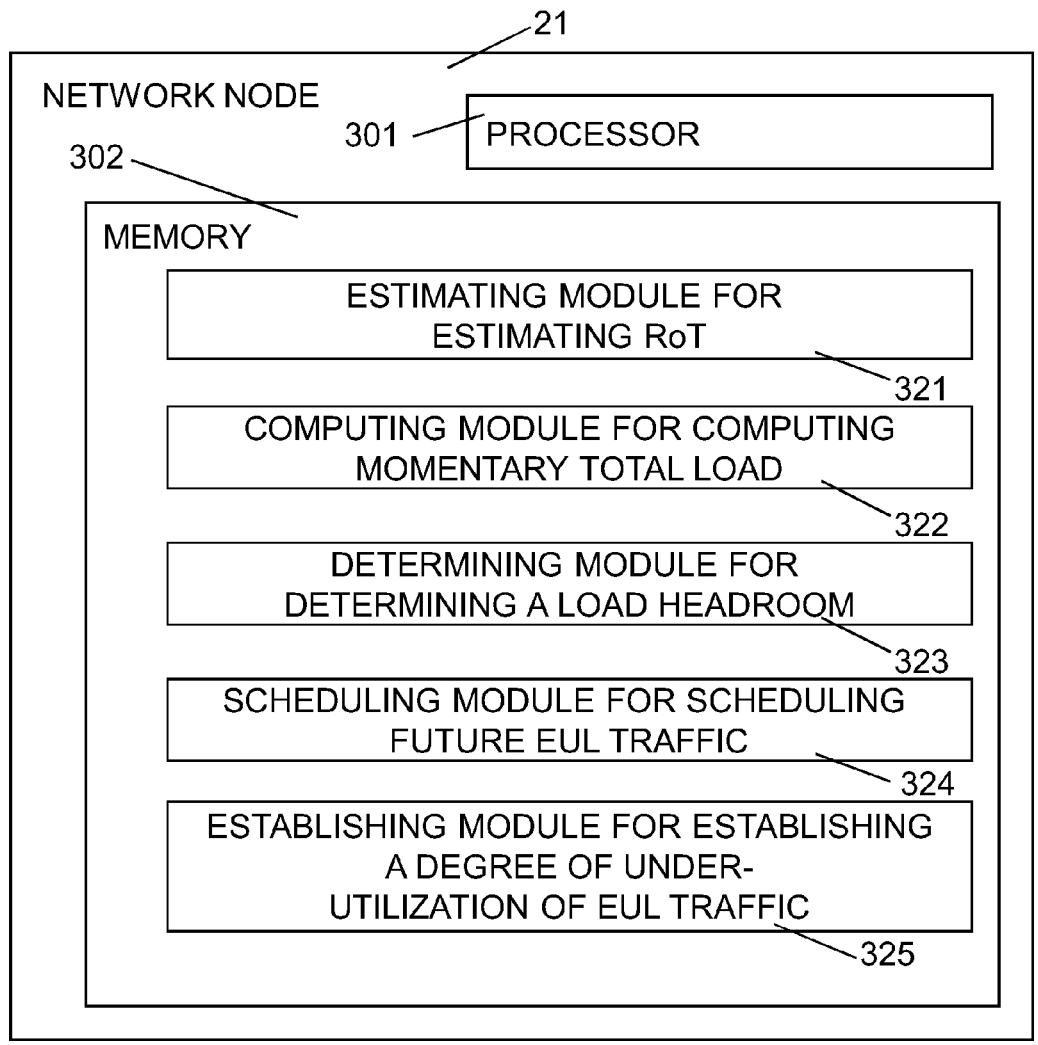
FIG. 10 is a block diagram of another embodiment of a network node based on a processor.

FIG. 10 is a schematic block diagram illustrating an example of a network node 21 comprising a group of function modules. An estimating module 321 is provided for estimating a rise-over-thermal measure for the cell. A computing module 322 is provided for computing a momentary total load in the cell based on the estimated rise-over-thermal measure. A determining module 323 is provided for determining a load headroom from at least a maximum allowed load and the momentary load. A scheduling module 324 is provided for scheduling future enhanced uplink traffic in dependence of the determined load headroom. An establishing module 325 is provided for establishing a degree of underutilization of enhanced uplink traffic grants in the cell. The scheduling module 324 is thereby further capable of overbooking of enhanced uplink traffic in dependence on the established underutilization degree.

The software or computer program may be realized as a computer program product, which is normally carried or stored on a computer-readable medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Universal Serial Bus (USB), memory, a Hard Disk Drive (HDD) storage device, a flash memory, or any other conventional memory device. The computer program may thus be loaded into the operating memory of a computer or equivalent processing device for execution by the processing circuitry thereof.

In one embodiment, the computer program product thus comprises a computer-readable medium on which a computer program is stored. The computer program comprises program code, which when executed by a processing circuitry causes the processing circuitry to estimate a rise-over-thermal measure for the cell, to compute a momentary total load in the cell based on the estimated rise-over-thermal measure, to determine a load headroom from at least a maximum allowed load and the momentary load, to schedule future enhanced uplink traffic in dependence of the determined load headroom, and to establish a degree of underutilization of enhanced uplink traffic grants in the cell, whereby the scheduling comprises overbooking of enhanced uplink traffic in dependence on the established underutilization degree.

Figure 11:
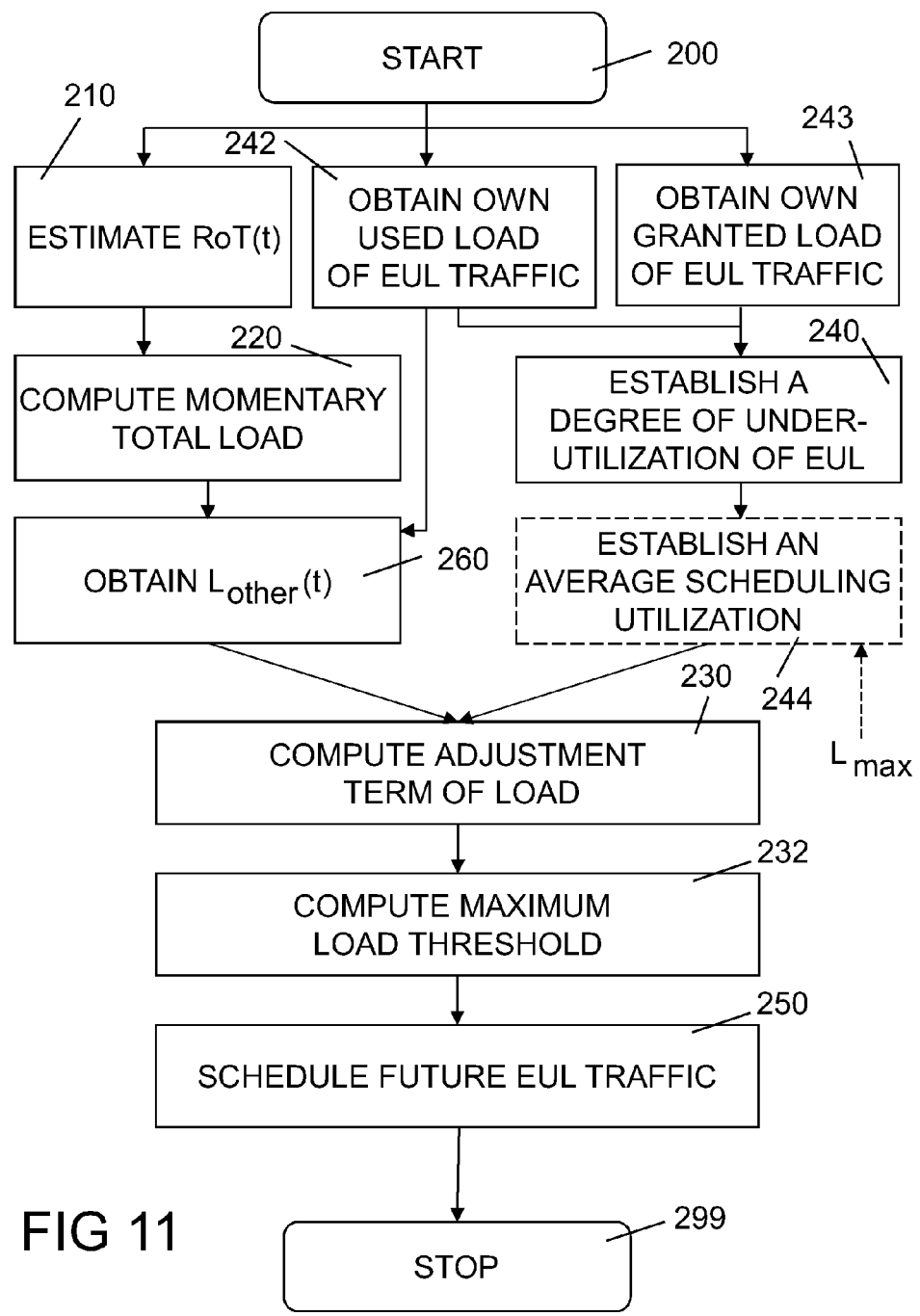
FIG. 11 is a flow diagram of steps of another embodiment of a method for scheduling enhanced uplink traffic.

Another embodiment of a method for scheduling enhanced uplink traffic in a cell in a cellular communication system is illustrated in FIG. 11. In this embodiment it is assumed that load is re-scheduled each time. The consequence is that it becomes necessary to have an opinion of the other cell interference, i.e. $L_{other}(t)$. This follows since the measured headroom is then not easily obtained from the previously measured headroom. The scheduling decisions may have changed completely. The embodiment therefore discloses a solution where the following is computed:

$$L_{used,RoT}(t) = 1 - \frac{1}{RoT(t)}. \quad (23)$$

$$L_{other}(t) = \gamma_3 L_{other}(t-1) + (1 - \gamma_3)(L_{used,RoT}(t) - L_{own,measured}(t)). \quad (24)$$

The filtering time constant can be quite small here, since $L_{other}(t)$ is based on the accurate $L_{used,RoT}(t)$.

The nominal load headroom for the own cell is now:

$$L_{No\ min\ alHeadroom}(t) = L_{RoT,max} - L_{other}(t), \quad (25)$$

meaning that the following compensated scheduled loads can be obtained as $$L_{Scheduled}(t) = \frac{\beta(t)}{\alpha(t)} L_{No\ min\ alHeadroom}(t) \quad (26)$$

or $$L_{Scheduled}(t) = \delta \frac{\beta(t)}{\alpha(t)} L_{No\ min\ alHeadroom}(t) \quad (27)$$

if the same safety factor δ as in the embodiment further above is introduced. Equation (26) can also be modified by introduction of the factor o introducing overbooking:

$$L_{Scheduled}(t) = o \frac{\beta(t)}{\alpha(t)} L_{No\ min\ alHeadroom}(t). \quad (28)$$

In an alternative embodiment, the factor β(t) can be set to 1 in any of the equations (26)-(28), thereby ignoring any dependence on average scheduling utilization.

In the present embodiment, it is considered as an advantage if the load compensated for under-utilization or over-booked, instead could be handled by normal scheduling as in prior art, without compensation for under-scheduling or overbooking.

Therefore, an increased time varying maximum threshold that replaces $L_{RoT,max}$ is computed.

Straightforward computations show that such a threshold is given by:

$$\begin{aligned} L_{max,compensated}(t) &= L_{Scheduled}(t) + L_{other} \quad (29) \\ &= \delta \frac{\beta(t)}{\alpha(t)} L_{No\ min\ alHeadroom}(t) + L_{other}(t) \\ &= L_{RoT,max} + \left(\delta \frac{\beta(t)}{\alpha(t)} - 1\right) L_{Rot,max} - \left(\delta \frac{\beta(t)}{\alpha(t)} - 1\right) L_{other} \\ &= L_{RoT,max} + \left(\delta \frac{\beta(t)}{\alpha(t)} - 1\right)(L_{Rot,max} - L_{other}). \end{aligned}$$

Here, $L_{No\ min\ alHeadroom} = L_{RoT,max} - L_{other}$. Hence in case the nominal maximum RoT is adjusted with a term:

$$\Delta L(t) = \left(\frac{\beta(t)}{\alpha(t)} - 1\right)(L_{RoT,max} - L_{other}), \quad (30)$$

then normal scheduling could be applied with a varying threshold.

In case of planned under-utilization, the adjustment becomes:

$$\Delta L_\mathcal{E}(t) = \left(\delta \frac{\beta(t)}{\alpha(t)} - 1\right)(L_{RoT,max} - L_{other}), \quad (31)$$

In case of overbooking, the term becomes:

$$\Delta L_o(t) = \left(o \frac{\beta(t)}{\alpha(t)} - 1\right)(L_{RoT,max} - L_{other}). \quad (32)$$

An embodiment of a method according to the details above is, as mentioned, described in FIG. 9. The method starts by measurement, in step 242, and fetching, in step 243, of load factors needed for estimation of the utilized load. In this particular embodiment, this is made by TFCI decoding and fetching information from the scheduler, respectively. The estimation, in step 240, of the utilized load is in the present embodiment done, based on the load factors, according to (12). The method also receives measurements of the received total wideband power (RTWP). This measurement is used for estimation, in step 210, of the thermal noise power floor and subsequently the RoT(t). Following this, the corresponding load is computed in step 220. This quantity is very accurate and is available with a high BW with maintained accuracy. This is then used to update the estimated other load, in step 260, in this embodiment according to (24). The method proceeds to step 230, where the adjustment term is calculated according to one of (30), (31) or (32), depending on if underutilization or overbooking or neither of them is to be used. In step 232, a maximum load threshold is computed, based on the $L_{RoT,max}$ and the adjustment. Finally, in step 250, the method schedules load up to the available compensated/overbooked maximum load threshold. This scheduling can then be performed, as such, according to prior art principles.

As in the previous embodiment, the embodiment above may be implemented in the RBS of the WCDMA RAN. The RTWP measurement and the RoT estimator can be implemented either in the radio subsystem or in base band. All remaining functionality is implemented in base band. The base band contains a scheduling unit that in turn has a load estimator and a load predictor associated with it. The load estimator receives data from a so called TFCI decoder that allows it to compute the measured $L_{own,measured}(t)$. The load predictor stores earlier predicted loads $L_{own,predicted}(t)$ that the scheduler was using to evaluate scheduling decisions that affected the current measured own cell load. To be able to implement the embodiment, the base band is equipped with a utilization estimator that keeps track of the average load utilization of EUL. The base band may also be equipped with a scheduling utilization estimator. The base band also contains another load estimation unit, by which the base band can obtain the other cell load. That information is then used by the load predictor to adjust the maximum load threshold ($L_{RoT,max}+\Delta L(t)$ or $L_{RoT,max}+\Delta L_o(t)$), accounting for i) the estimated utilization, ii) the estimated scheduling utilization, iii) a preconfigured parameter determining if overbooking is to be applied, and the estimated $L_{other}$. The embodiment schedules own cell load according to prior art methods, assuming that no under-utilization or overbooking exists. The grants corresponding to the scheduled load are then sent to the affected UEs.

One advantage with the proposed technology is that it provides refined load control, based on the accurately measured and high bandwidth RoT, enabling load overbooking, and thereby boasting UL throughput significantly. Furthermore, the proposed technology provides more accurate load prediction, accounting for on-line estimated load utilization, thereby avoiding under-utilization of the EUL.

The different embodiments address the problem with underutilization in five aspects in different combinations. One aspect is that an average utilization of the load is estimated, and optionally, a maximum allowed scheduled load. Another aspect is determining of an exact, or at least more exact than in prior art, load headroom, by direct determination of the total EUL load from the estimated RoT. Yet another aspect is computing of a compensated scheduled own cell load using the estimated average load utilization, such that the available headroom can be fully used in one scheduling step even in case the utilization would be as low as the estimated average utilization.

Furthermore, in another aspect, overbooking of load is performed by artificially increasing the headroom to correspond to a higher load than the standard load threshold, even allowing the headroom to correspond to loads above 1. In another aspect, the other cell interference is obtained as the difference between the load corresponding to the RoT, and the measured own cell load.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

ABBREVIATIONS

ASIC Application Specific Integrated Circuit
CD Compact Disc
CPU Central Processing Unit
DL Downlink
DPCCH Dedicated Physical Control CHannel
DSP Digital Signal Processor
DVD Digital Versatile Disc
E-AGCH Enhanced-dedicated-channel Absolute Grant CHannel
E-DPCCH Enhanced-dedicated-channel Dedicated Physical Control CHannel
E-DPDCH Enhanced-dedicated-channel Dedicated Physical Data CHannel
E-HICH Enhanced-dedicated-channel Hybrid Indicator CHannel
E-RGCH Enhanced-dedicated-channel Relative Grant CHannel
EUL Enhanced Uplink
FCC Fast Congestion Control
FPGA Field Programmable Gate Array
HDD Hard Disk Drive
IC Interference Cancellation
PC Personal Computer
PDA Personal Digital Assistant
PLC Programmable Logic Controller
$P_N$ Thermal noise power floor level
RAM Random Access Memory
RAN Radio Access Network
ROM Read-Only Memory RoT Rise over Thermal
RBS Radio Base Station
RRU Remote Radio Units
RTWP Received Total Wideband Power
SINR Signal-to-Interference-and-Noise Ratio
SIR Signal-to-Interference Ratio
TFCI Transport Format Combination Indicator
TTI Transmission Time Interval
UE User Equipment
UL UpLink
USB Universal Serial Bus
WCDMA Wideband Code Division Multiple Access

REFERENCES

[1] T. Wigren and P. Hellqvist, "Estimation of uplink WCDMA load in a single RBS", Proc. IEEE VTC-2007 Fall, Baltimore, Md., USA, Oct. 1-3, 2007.
[2] T. Wigren, "Recursive noise floor estimation in WCDMA", IEEE Trans. Veh. Tech., vol. 59, no. 5, pp. 2615-2620, 2010.
[3] T. Wigren, "WCDMA uplink load estimation with generalized rake receivers", IEEE Trans. Vehicular Tech., vol. 61, no. 5, pp. 2394-2400, 2012.

APPENDIX A

Figure 2:
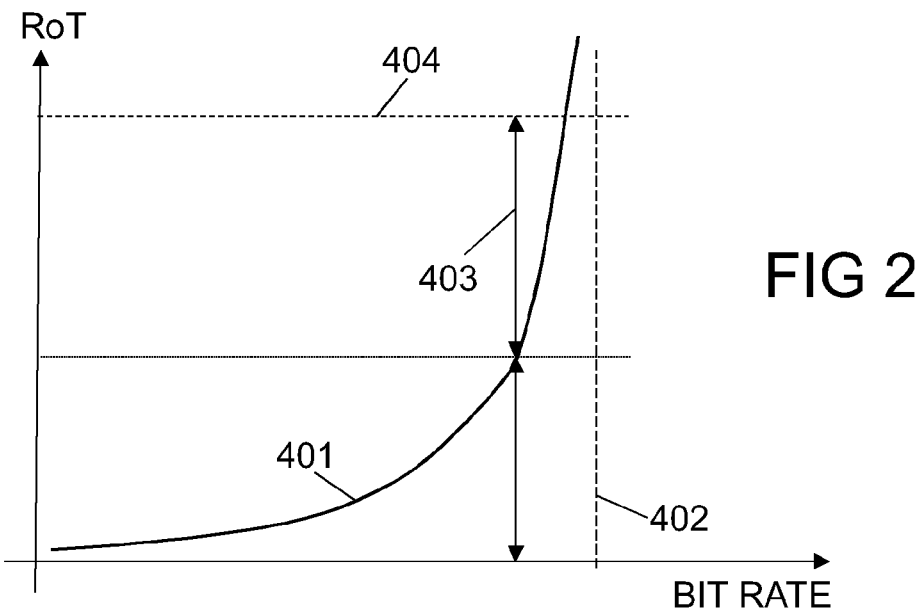
FIG. 2 is diagram illustrating the air interface load.

As mentioned further above the air-interface load in WCDMA is typically determined in terms of the RoT. FIG. 2 illustrates an air interface load, where curve 401 corresponds to the RoT or noise rise, i.e. the ratio between the Received Total Wideband Power (RTWP) and the thermal noise power floor level ($P_N$). The pole capacity 302 is the limiting theoretical bit rate of the uplink, corresponding to an infinite noise rise. A maximum scheduling threshold 404 is set at such a noise rise level that power rushes becomes unlikely to appear if the RoT is lower than the maximum scheduling threshold 404. There is a difference between the RoT 401 and maximum scheduling threshold 404 at each instant, being defined as the scheduling headroom 403. At each instant, this corresponds to the amount of resources that is possible to utilize for e.g. EUL purposes.

The maximum scheduling threshold 404 can be set according to different approaches. In a careful approach, a low maximum scheduling threshold is used, in order to ensure that power rushes will be very rare. In a somewhat more aggressive approach, the maximum scheduling threshold can be set somewhat higher giving the result that the power rushes may occur occasionally. In such approaches, FCC functionalities may be utilized to mitigate the power rushes. In a very aggressive approach, the maximum scheduling threshold may even be set at a level that normally gives a power rush. However, due to underutilization or inaccuracies in load estimation, the actual utilization of the headroom in many cases becomes lower that scheduled and the power rushes may be avoided more or less as a blind gambling. In order to have a high utilization without too large risks for power rushes, other approaches have to be employed.

In the WCDMA, there are provisions for supporting EUL. The uplink data channel is denoted Enhanced-dedicated-channel Dedicated Physical Data CHannel (E-DPDCH). This channel supports a high rate. It is, however, not involved in the scheduling control as such. This is instead the task of the corresponding control channel, denoted Enhanced-dedicated-channel Dedicated Physical Control CHannel (E-DPCCH). This channel carries e.g. rate requests (measurement signals) from the UEs to the EUL scheduler.

There are also some downlink channels supporting EUL. The first of these is the Enhanced-dedicated-channel Absolute Grant CHannel (E-AGCH) which carries absolute grants (control signals) to each UE. More peripheral is the Enhanced-dedicated-channel Relative Grant CHannel (E-RGCH) which carries relative grants (also control signals) from the node B to the UE. Finally, the Enhanced-dedicated-channel Hybrid Indicator CHannel (E-HICH) carries ACK/NACK information.

Below, the measurement and estimation techniques, to measure the instantaneous total load on the uplink air interface are briefly described. Due to the delay inherent in the scheduling loop, the estimated load can be very different from the predicted load. The predicted load is treated further below.

It is e.g. shown in prior art that the load at the antenna connector is given by the noise rise, or rise over thermal, RoT(t), defined by:

$$RoT(t) = \frac{P_{RTWP}(t)}{P_N(t)}, \tag{1}$$

where $P_N(t)$ is the thermal noise power floor level as measured at the antenna connector. It remains to define what is meant with $P_{RTWP}(t)$. This relative measure is unaffected of any de-spreading applied. The definition used here is simply the received total wideband power:

$$P_{RTWP}(t) = \sum_{i=1}^{I} P_k(t) + P_{neighbor}(t) + P_N(t), \tag{2}$$

also measured at the antenna connector. Here $P_{neighbor}(t)$ denotes the power as received from neighbor cells of the WCDMA system, while $P_i(t)$ denotes the power of user i in the own cell. A major difficulty of any RoT estimation algorithm is to separate the thermal noise power from the inter-cell interference from neighbor cells.

Another specific problem that needs to be addressed is that the signal reference points are, by definition at the antenna connectors. The measurements are however obtained after the analogue signal conditioning chain, in the digital receiver. The analogue signal conditioning chain does introduce a scale factor error of about 1 dB (1-sigma) that is difficult to compensate for. Fortunately, all powers of (2) are equally affected by the scale factor error so when (1) is calculated, the scale factor error is cancelled as:

$$RoT^{DigitalReceiver}(t) = \frac{P_{RTWP}^{DigitalReceiver}(t)}{P_N^{DigitalReceiver}(t)} = \frac{\gamma(t) P_{RTWP}^{Antenna}(t)}{\gamma(t) P_N^{Antenna}(t)} = RoT^{Antenna}(t). \tag{3}$$

In order to understand the fundamental problem of neighbor cell interference when performing load estimation, note that:

$$P_{neighbor}(t) + P_N(t) = E[P_{neighbor}(t)] + E[P_N(t)] + \Delta P_{neighbor}(t) + \Delta P_N(t), \tag{4}$$

where E[ ] denotes mathematical expectation and where Δ denotes the variation around the mean. The fundamental problem can now be clearly seen. Since there are no measurements available in the RBS that are related to the inter-cell interference, a linear filtering operation can at best estimate the sum $E[P_{neighbor}(t)]+E[P_N(t)]$. This estimate cannot be used to deduce the value of $E[P_N(t)]$. The situation is the same as when the sum of two numbers is available. Then there is no way to figure out the values of the individual numbers. This issue can be analyzed rigorously for the RoT estimation problem and it can be proved that the noise power floor is not mathematically observable.

Figure 3:
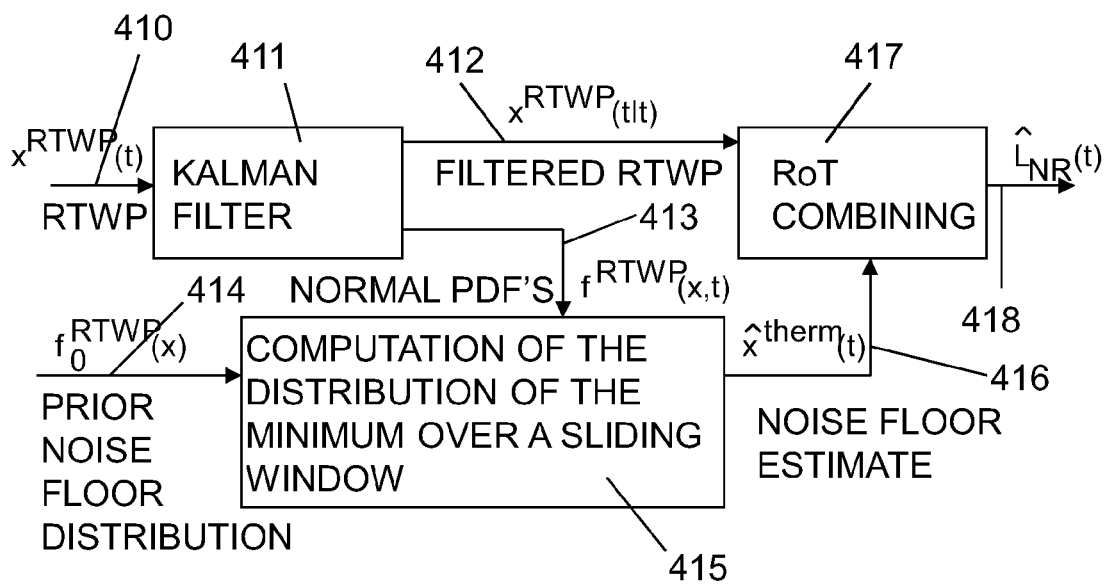
FIG. 3 is a block diagram of a baseline RoT estimation algorithm.

A RoT estimation algorithm currently in use, the sliding window noise floor estimation algorithm, is depicted in FIG. 3, see also [1]. The algorithm estimates the RoT, as given by (1). The main problem solved by the estimation algorithm is the accurate estimation of the thermal noise power floor $P_N(t)$. Since it is not possible to obtain exact estimates of this quantity due to the inter-cell interference, the estimator therefore applies an approximation, by consideration of the soft minimum as computed over a relative long window in time. It is important to understand that this estimation relies on the fact that the noise floor is constant over very long periods of time, disregarding the small temperature drift.

As a summary of the RoT estimation algorithm, RTWP 410 is measured and a Kalman filter 411 provides a filtered RTWP 412. The Kalman filter further provides normal power density functions 413 of the RTWP and provides this to a noise floor estimator 415. The noise floor estimator 415 computes a distribution of a minimum over a sliding window by use of a prior noise floor distribution 414 and provides a noise floor estimate 416. The noise floor estimate 416 and the filtered RTWP 412 are combined in a combiner 417 to a RoT value 408.

$$P_{RTWP}(t) - P_N(t) = \sum_{i=1}^{N} L_i(t) P_{RTWP}(t) + P_{neighbor}(t), \quad (5)$$

where $L_i(t)$ is the load factor of the i:th user of the own cell and where $P_{neighbor}(t)$ denotes the neighbor cell interference, which is also denoted inter-cell interference. The load factors of the own cell are computed as follows. First it is noted that:

$$(C/I)_i(t) = \frac{P_i(t)}{P_{RTWP}(t) - (1-\alpha)P_i} = \frac{L_i(t)P_{RTWP}(t)}{P_{RTWP}(t) - (1-\alpha)L_i(t)P_{RTWP}(t)} = \frac{L_i(t)}{1 - (1-\alpha)L_i(t)} \Leftrightarrow L_i(t) = \frac{(C/I)_i(t)}{1 + (1-\alpha)(C/I)_i(t)}, \quad (6)$$

$$i = 1, \ldots, I,$$

where I is the number of users in the own cell and $\alpha$ is the self-interference factor. The $(C/I)_i(t)$, $i=1, \ldots, I$, are then related to the Signal-to-Interference-and-Noise Ratio (SINR) (measured on the Dedicated Physical Control CHannel (DPCCH)) as follows:

$$(C/I)_i(t) = \frac{SINR_i(t)}{W_i} \frac{RxLoss}{G} \times \left(1 + \frac{\beta_{DPDCH,i}^2(t) + \beta_{EDPCCH,i}^2(t) + n_{codes,i}(t)\beta_{EDPDCH,i}^2(t) + \beta_{HSDPCCH,i}^2(t)}{\beta_{DPCCH}^2(t)}\right) \quad (7)$$

$$i = 1, \ldots, I.$$

The sliding window algorithm of the above section has the disadvantage of requiring a large amount of storage memory. This becomes particularly troublesome in case a large number of instances of the algorithm is needed, as may be the case when Interference Cancellation (IC) is introduced in the uplink. To reduce the memory consumption a recursive algorithm has been disclosed. That algorithm reduces the memory requirements of the sliding window scheme discussed above at least by a factor of 100-1000, see e.g. [2]. The approaches disclosed here are applicable both to the sliding window RoT estimation algorithm and the recursive algorithm.

Next, techniques, applicable to predict the instantaneous load on the uplink air interface ahead in time, are briefly described. Note again that the predicted load that is used for scheduling decision can be very different from the estimated one, due to the scheduling loop delay. The load prediction functionality is needed by the scheduler of EUL. The reason is that the scheduler tests different combinations of grants to determine the best combinations, e.g. maximizing the throughput. This scheduling decision will only affect the air interface load after a number of Transmission Time Intervals (TTIs), due to grant transmission latency and UE latency before the new grant takes effect over the air interface. Each such TTI is typically 2 or 10 ms.

A Signal-to-Interference Ratio (SIR) based prediction of uplink load, for a tentative scheduled set of users and grants, can be based on the power relation:

Here $W_i$ is the spreading factor, RxLoss represents missed receiver energy, G is the diversity gain and the $\beta$:s are the beta factors of the respective channels, assuming not active channels to have zero beta factors.

The UL load prediction then computes the uplink load of the own cell by a calculation of (6) and (7) for each user of the own cell, followed by the summation:

$$L_{own}(t) = \sum_{i=1}^{I} L_i(t) \quad (8)$$

which transforms (5) to:

$$P_{RTWP}(t) = L_{own}(t)P_{RTWP}(t) + P_{neighbor}(t) + P_N(t). \quad (9)$$

A division with $P_N(t)$ then shows that the RoT can be predicted k TTIs ahead as:

$$RoT(t+kT) = \frac{P_{neighbor}(t)/P_N(t)}{1 - L_{own}(t)} + \frac{1}{1 - L_{own}(t)}. \quad (10)$$

The SIR based load factor calculation can also be replaced by a power based one, where the basic definition of the load factor:

$$L_i(t) = \frac{P_i(t)}{P_{RTWP}(t)}, \quad (11)$$

is used, instead of (6). The advantage is that the parameter dependence is reduced. On the downside a measurement of the user power is needed. This is the method that is preferred as pre-requisite for the present ideas.

Figure 4:
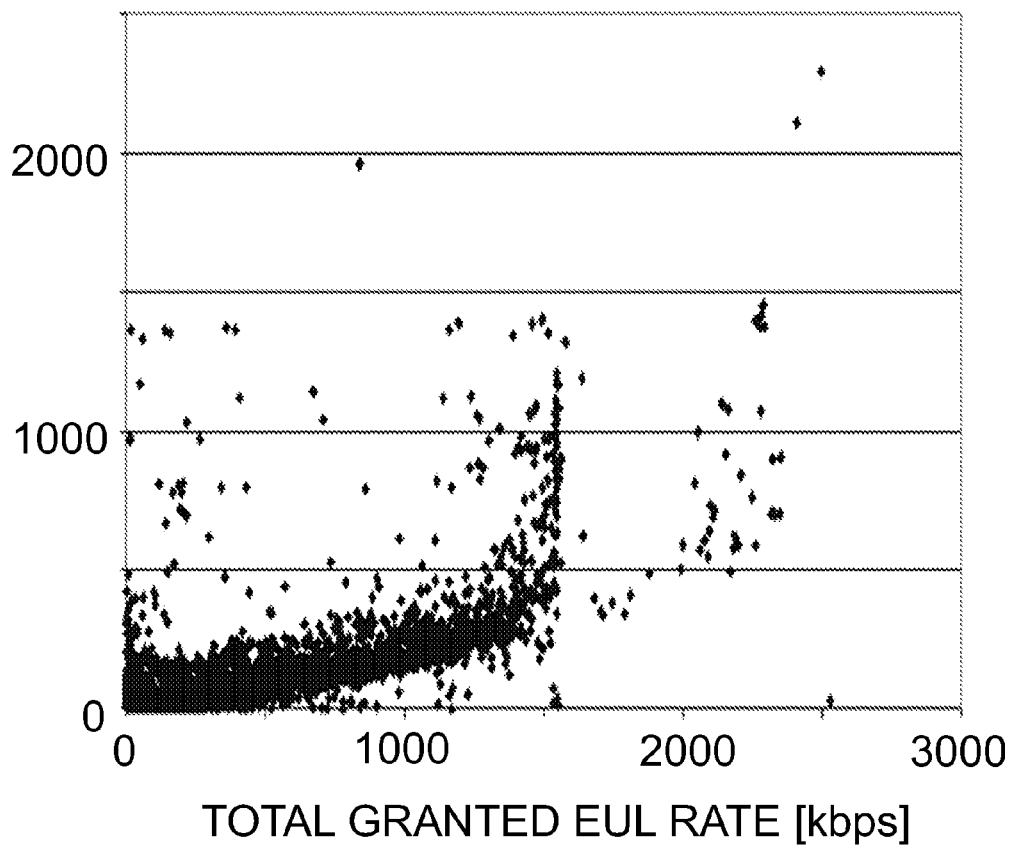
FIG. 4 is a diagram illustrating underutilization of grants in EUL.

This is evident from field measurements as those depicted in FIG. 4. That plot indicates a grant utilization of only about 25%. This is evidently an unacceptable waste of air-interface resources. In particular the interference suppression gains, see e.g. [3], have a very strong impact. The details are, however, not important for the operation of the current approaches, which can handle any reason for underutilization.

Figure 5:
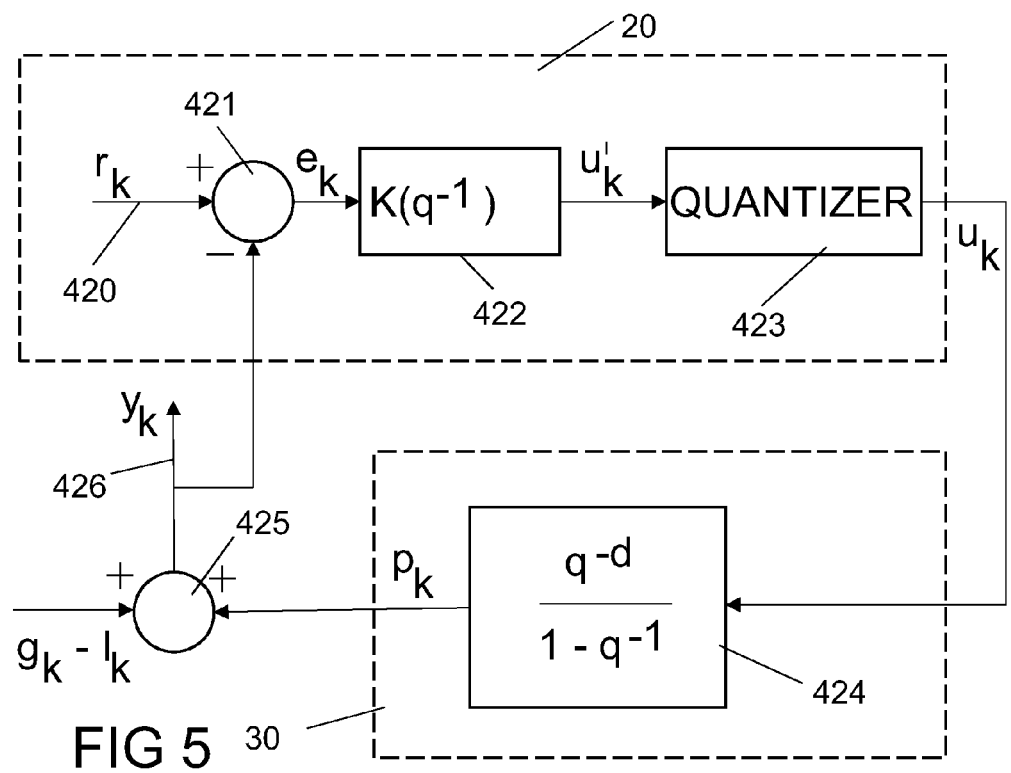
FIG. 5 is a block diagram of WCDMA inner loop power control.

A simplified block diagram of the inner power control loop of one UE in the WCDMA uplink appears in FIG. 5. Note that the quantities are expressed in a logarithmic scale ([dB]). A target SIR $r_k$ is, within a RBS 20, received at an input 420. k denotes discrete time ([slot, 667 micro seconds]). A subtractor subtracts a measured SIR $y_k$ from the target SIR $r_k$ giving a SIR error $c_k$. A controller 422 provides a control signal $u_k$ based on the SIR error $c_k$, in the current implementation a constant. Here $q^{-1}$ denotes the backward shift operator. A quantizer 423 transforms the control signal $u'_k$ to a one-bit quantized transmitted control signal $u_k$, that is transmitted to a UE 30. In the UE 30, a filter 424 transforms the received one-bit quantized control signal into a transmit power $p_k$. d denotes the delay in slots. The transmit power $p_k$ adds to the uplink channel gain $g_k$ and the interference $I_k$ into the measured SIR $y_k$. The inner loop power controller operates typically at a frequency of 1500 Hz.

FCC known in prior art can be based on using consecutive estimate of the RoT, estimated at least as fast as the power control bandwidth of 1500 Hz. Functions of this RoT, e.g. the rate of change and the absolute level, are then compared to corresponding thresholds and a power rush is declared if one or more of the functions exceed their corresponding thresholds. Actions are taken in response to a declared power rush, normally by breaking at least a subset of the power control loops. This may be performed e.g. by sending a "down" command as long as an interference rush persists.

The invention claimed is:

1. A method for scheduling enhanced uplink traffic in a cell in a cellular communication system, comprising:
   estimating a rise-over-thermal measure for said cell;
   computing a momentary total load in said cell based on said estimated rise-over-thermal measure;
   determining a load headroom from at least a maximum allowed load and said momentary load;
   scheduling future enhanced uplink traffic in dependence of said determined load headroom; and
   establishing a degree of underutilization of enhanced uplink traffic grants in said cell;
   wherein said scheduling comprises overbooking of enhanced uplink traffic in dependence on said established underutilization degree;
   wherein the method is performed by a network node.

2. The method according to claim 1, characterized by:
   obtaining a quantity of an own used load of enhanced uplink traffic; and
   obtaining a quantity of an own granted load of enhanced uplink traffic;
   wherein said establishing the degree of underutilization of enhanced uplink traffic grants in said cell comprises estimating a utilization factor expressing a relation between said quantity of an own used load of enhanced uplink traffic and said quantity of an own granted load of enhanced uplink traffic.

3. The method according to claim 2, characterized in that said estimating the utilization factor comprises filtering a number of ratios between said quantity of an own used load of enhanced uplink traffic and said quantity of an own granted load of enhanced uplink traffic.

4. The method according to claim 3, characterized in that said filtering is a linear filtering.

5. The method according to claim 2, characterized in that said obtaining a quantity of an own used load of enhanced uplink traffic comprises the step of measuring an own used load of enhanced uplink traffic by decoding a Transport Format Combination Indicator (TFCI) message.

6. The method according to claim 2, characterized in that said obtaining a quantity of an own granted load of enhanced uplink traffic comprises fetching grant orders from a scheduler.

7. The method according to claim 2, characterized by:
   obtaining a value of a maximum allowed load of enhanced uplink traffic;
   estimating a scheduling utilization factor by said measure of an own granted load of enhanced uplink traffic and said value of the maximum allowed load of enhanced uplink traffic;
   wherein said establishing the degree of underutilization of enhanced uplink traffic grants in said cell comprises compensating said degree of underutilization by said scheduling utilization factor.

8. The method according to claim 2, wherein said determining the load headroom comprises determining a nominal load headroom, said nominal load headroom being calculated as a difference between a maximum allowed rise-over-thermal and an estimated load from sources outside said cell, said estimated load from sources outside said cell being a filtered difference between said momentary total load in said cell and said own used load of enhanced uplink traffic.

9. The method according to claim 1, wherein said determining the load headroom comprises determining a momentary load headroom, said momentary headroom being calculated as a difference between a maximum allowed rise-over-thermal and said momentary total load in said cell.

10. A network node in a cell of a cellular communication system, comprising:
    a processor and memory including a load meter;
    said load meter configured to estimate a rise-over-thermal measure for said cell;
    said load meter further configured to compute a momentary total load in said cell based on said estimated rise-over-thermal measure;
    said load meter further configured to determine a load headroom from at least a maximum allowed load and said momentary load; and
    a scheduling assistant in information contact with said load meter;
    said scheduling assistant configured to schedule future enhanced uplink traffic in dependence of said determined load headroom;
    said scheduling assistant further configured to establish a degree of underutilization of enhanced uplink traffic grants in said cell;

said scheduling assistant further configured to overbook enhanced uplink traffic in dependence on said established underutilization degree.

11. The network node according to claim 10, characterized in that:
said scheduling assistant further configured to obtain a quantity of an own used load of enhanced uplink traffic;
said scheduling assistant further configured to obtain a quantity of an own granted load of enhanced uplink traffic; and
said scheduling assistant is further configured to establish the degree of underutilization of enhanced uplink traffic grants in said cell;
wherein to establish the degree of underutilization, said scheduling assistant is configured to estimate a utilization factor expressing a relation between said quantity of an own used load of enhanced uplink traffic and said quantity of an own granted load of enhanced uplink traffic.

12. The network node according to claim 11, characterized in that said scheduling assistant is further configured to filter a number of ratios between said quantity of an own used load of enhanced uplink traffic and said quantity of an own granted load of enhanced uplink traffic to estimate the utilization factor.

13. The network node according to claim 12, characterized in that said scheduling assistant is a linear filter.

14. The network node according to claim 11, characterized in that said scheduling assistant is further configured to decode a Transport Format Combination Indicator (TFCI) message to measure said quantity of said own used load of enhanced uplink traffic.

15. The network node according to claim 11, characterized in that said scheduling assistant is further configured to fetch grant orders from a scheduler to obtain said quantity of said own granted mode of enhanced uplink traffic.

16. The network node according to claim 11, characterized in that:
said scheduling assistant is further configured to obtain a value of a maximum allowed load of enhanced uplink traffic;
said scheduling assistant further configured to estimate a scheduling utilization factor by said quantity of an own granted load of enhanced uplink traffic and said value of the maximum allowed load of enhanced uplink traffic;
said scheduling assistant is further configured to compensate said degree of underutilization by said scheduling utilization factor to establish a degree of underutilization of enhanced uplink traffic grants in said cell.

17. The network node according to claim 11, characterized in that said load meter is further configured to determine the load headroom based on a nominal load headroom that is calculated as a difference between a maximum allowed rise-over-thermal and an estimated load from sources outside said cell, said estimated load from sources outside said cell being a filtered difference between said momentary total load in said cell and said own used load of enhanced uplink traffic.

18. The network node according to claim 10, characterized in that said load meter is further configured to determine the load headroom based on a momentary load headroom that is calculated as a difference between a maximum allowed rise-over-thermal and said momentary total load in said cell.

19. A network node in a cell of a cellular communication system, comprising:
a wireless interface, a network interface, a processor and a storage comprising instructions executable by said processor, said network node is to:
estimate a rise-over-thermal measure for said cell;
compute a momentary total load in said cell based on said estimated rise-over-thermal measure;
determine a load headroom from at least a maximum allowed load and said momentary load;
schedule future enhanced uplink traffic in dependence of said determined load headroom; and
establish a degree of underutilization of enhanced uplink traffic grants in said cell;
overbook enhanced uplink traffic in dependence on said established underutilization degree.

20. A network node in a cell of a cellular communication system, comprising:
an estimating module configured to estimate a rise-over-thermal measure for said cell;
a computing module configured to compute a momentary total load in said cell based on said estimated rise-over-thermal measure;
a determining module configured to determine a load headroom from at least a maximum allowed load and said momentary load;
a scheduling module configured to schedule future enhanced uplink traffic in dependence of said determined load headroom; and
an establishing module configured to establish a degree of underutilization of enhanced uplink traffic grants in said cell;
wherein said scheduling module is further configured to overbook enhanced uplink traffic in dependence on said established underutilization degree.

21. A non-transitory computer-readable storage medium storing a computer program that comprises program code, which when executed by a processing circuitry causes the processing circuitry to:
estimate a rise-over-thermal measure for a cell of a cellular communication system;
compute a momentary total load in said cell based on said estimated rise-over-thermal measure;
determine a load headroom from at least a maximum allowed load and said momentary load;
schedule future enhanced uplink traffic in dependence of said determined load headroom; and
establish a degree of underutilization of enhanced uplink traffic grants in said cell;
wherein the program code that causes the processing circuitry to schedule enhanced uplink traffic comprises program code that causes the processing circuitry to schedule enhanced uplink traffic in dependence on said established underutilization degree.

* * * * *